United States Patent
Kajuluri et al.

(10) Patent No.: US 11,528,162 B2
(45) Date of Patent: Dec. 13, 2022

(54) DETECTING AND RESOLVING DESYNCHRONIZATION OF TRIP COUNTER VALUES IN AUTHENTICATED MESSAGES

(71) Applicant: Ford Global Technologies, LLC, Dearborn, MI (US)

(72) Inventors: Venkata Kishore Kajuluri, Southgate, MI (US); Xin Ye, Farmington Hills, MI (US); Bradley Warren Smith, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 338 days.

(21) Appl. No.: 16/918,847

(22) Filed: Jul. 1, 2020

(65) Prior Publication Data
US 2022/0006665 A1 Jan. 6, 2022

(51) Int. Cl.
*H04L 12/40* (2006.01)
*G06F 9/4401* (2018.01)

(52) U.S. Cl.
CPC .......... *H04L 12/40* (2013.01); *G06F 9/4401* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

| | | | |
|---|---|---|---|
| 2015/0082380 A1* | 3/2015 | Nairn | H04L 63/1466 726/2 |
| 2016/0254924 A1* | 9/2016 | Hartwich | H04L 69/10 370/468 |
| 2016/0267024 A1* | 9/2016 | Bowler | G06F 3/0623 |
| 2017/0286675 A1 | 10/2017 | Shin et al. | |

FOREIGN PATENT DOCUMENTS

WO  2015-048058 A1  4/2015

OTHER PUBLICATIONS

Cho, et al. "Error Handling of In-vehicle Networks Makes Them Vulnerable", DOI: 10.1145/2976749.2978302, Oct. 24, 2016, 12 pages.
Autosar, "Specification of Secure Onboard Communication", Document ID 654, Part of Standard Release 4.3.1., Dec. 8, 2017, 150 pages.

* cited by examiner

*Primary Examiner* — Angela Nguyen
(74) *Attorney, Agent, or Firm* — Brandon Hicks; Kilpatrick Townsend & Stockton LLP

(57) ABSTRACT

Techniques for using a trip flag to detect desynchronization of trip counter values in a vehicle system. Techniques include a first electronic control unit (ECU) receiving a synchronization message including a trip counter and receiving a message from a second ECU including a trip flag. The trip flag includes a single bit of data generated by the second ECU. The first ECU compares the trip flag to a last bit of the trip counter stored at the first electronic control unit and processes the message in response to the trip flag matching (Continued)

the trip counter. The first ECU compares the trip counter to a previous trip counter based on the trip flag differing from the trip counter. The first ECU processes the message using the previous trip counter or increments the trip counter to process the message based on the comparison with the previous trip counter.

20 Claims, 7 Drawing Sheets

DETECTING AND RESOLVING DESYNCHRONIZATION OF TRIP COUNTER VALUES IN AUTHENTICATED MESSAGES

BACKGROUND

Modern vehicles include an internal network including more than one hundred microcontrollers, Electronic Control Units (ECUs) that control functions, safety, diagnostics, comfort, and infotainment. The ECUs communicate with each other and a vehicle computer system over a Controller Area Network (CAN) bus. The CAN bus handles all communications within a vehicle system and is highly impacted by desynchronized ECUs. Additionally, the CAN bus is one of the most widespread bus technologies in use and is a primary target for attacks. A counter-based system originating at a Freshness Value Master (FVM) provides freshness in authenticated messages to protect the system against replay attacks. Messages are authenticated by calculating the message authentication code and sending it along with the clear text.

SUMMARY

In some embodiments, techniques for detecting desynchronization of trip counter values between transmitters and receivers of authenticated messages within a vehicle system are described. In some embodiments, a system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions.

One general aspect includes a vehicle system, including a freshness value master, a first electronic control unit, and a second electronic control unit communicatively couple to the first electronic control unit and the freshness value master. The second electronic control unit includes a memory having stored thereon instructions that, upon execution by one or more processors, cause the one or more processors to perform operations such as the methods described herein. One general aspect includes a method, including receiving a synchronization message from the freshness value master, the synchronization message including a trip counter. The method also includes receiving an authenticated message from the first electronic control unit, the authenticated message including a trip flag including a single bit of data. The method includes comparing the trip flag to a last bit of the trip counter to generate a result and processing the authenticated message based on the result. Other embodiments of this aspect include corresponding computer systems, apparatus, and computer programs recorded on one or more computer storage devices, each configured to perform the actions of the methods.

Implementations may include one or more of the following features. Optionally, where the result is that the trip flag matches the last bit of the trip counter, the instructions to process the authenticated message include processing the authenticated message using the trip counter. Optionally, where the result is that the trip flag differs from the last bit of the trip counter, the instructions to process the authenticated message include further instructions that include comparing the trip counter with a previous trip counter of a previous authenticated message and processing the authenticated message using the previous trip counter based on a determination that the trip counter differs from the previous trip counter. Optionally, based on a determination that the trip counter matches the previous trip counter the authenticated message may increase a value of the last bit of the trip counter to generate a new trip counter. The authenticated message may be processed using the new trip counter. Optionally, the freshness value master transmits the synchronization message at a periodic interval. Optionally the freshness value master increments the trip counter in response to at least one of a startup or a reset of the vehicle system. Optionally, the first electronic control unit is communicatively coupled to the second electronic control unit via a vehicle data bus. Optionally, the vehicle data bus is a controller area network can bus. Implementations of the described techniques may include hardware, a method or process, or computer software on a computer-accessible medium.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
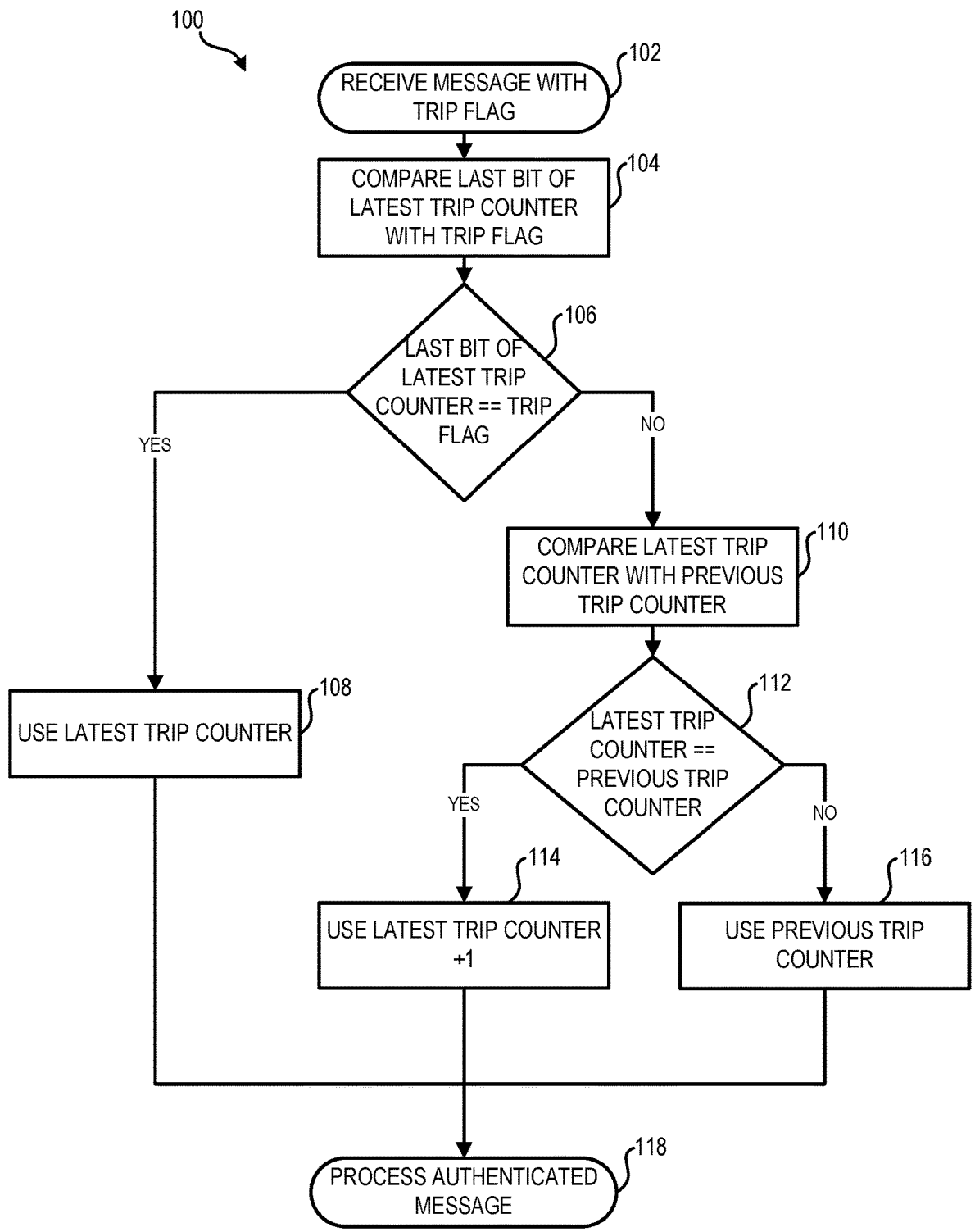
FIG. 1 illustrates a flow diagram depicting a process for detecting and correcting desynchronization of trip counter values between transmitters and receivers of authenticated messages, according to some embodiments.

Modern vehicles include many Electronic Control Units (ECUs) communicating with each other and with a vehicle computing system. Maintaining synchronization of the various ECUs and other electronic components of the vehicle system may help ensure security of authenticated messages passed within the system. Without a freshness value, receivers will process authenticated messages as trusted messages and act on the message content. This may be exploited by replay attacks on the system. The addition of a freshness value ensures that replay attacks are prevented, however the freshness value alone may cause the system to be vulnerable to miscommunications and desynchronization in response to miscommunicated or missed synchronization messages.

In the typical time cycle of synchronization messages in a Trip Counter Based Freshness (TCBF) system, hundreds of authenticated messages may be communicated between elements or ECUs of a vehicle system. In the TCBF, a freshness value is introduced in the use of a set of decoupled counters. A trip counter increments on each startup or reset of the vehicle system. A reset counter increments periodically and resets to an initial value when the trip counter is incremented. A message counter increments per each message transmission and resets to an initial value when the reset counter is incremented. A Freshness Value Master (FVM) updates the trip counter and reset counter values and sends out a synchronization message to elements of the system. The elements of the system, such as ECUs, combine the trip counter, reset counter, and message counter values and use them collectively for authenticated communication over the vehicle bus. In a TCBF system, in the event there is a delay or error in reception of a synchronization message between elements of the system, none of the messages or communications between the elements will be validated and processed until the next synchronization message is received by the elements. If one of the elements or ECUs goes out of synchronization with the trip counter values, all authenticated messages with the desynchronized element will result in an error and will not be processed. Additionally, delays in real-time operation and communication within the vehicle system can cause desynchronization, as such, systems for accounting for missed synchronization messages in a TCBF system should not cause additional significant processing delays. Accordingly, the description provided herein provides for a trip flag to be added to the authenticated message and a logic system for ensuring desynchronization due to missed synchronization messages does not result in errors of the system.

The systems and methods described herein may be used to enhance the reliability and robustness of a system for communications between elements of a vehicle system. The reliability and robustness are improved without reduction in quality or speed of message communication due to the small processing requirement for the additional trip flag element of each message.

Turning to FIG. 1, a flow diagram 100 depicting a logical flow for detecting and correcting desynchronization of trip counter values between transmitters and receivers of authenticated messages is depicted, according to some embodiments. The flow diagram 100 may represent a process performed by an ECU (e.g., ECU A 204 or ECU B 206 as described with respect to FIG. 2) of a vehicle system, for example upon receiving a message from another ECU or other element of the vehicle system. The flow diagram 100 may be described in computer-readable instructions stored on a storage device and executed by one or more processors of the ECU.

The flow diagram 100 begins at 102 with the ECU receiving a message from a second ECU, the message including a trip flag. The trip flag includes a single bit of data. The trip flag is generated and added to the authenticated message by the second ECU, the bit of data including the last bit of the current trip counter value stored at the second ECU. The trip counter value is incremented with each ignition or reset of the vehicle system. The details of the trip counter value, reset counter value, and message counter value are described below with respect to FIG. 2. The authenticated message may include data, instructions, or any other suitable information communicated between ECUs or elements of the vehicle system.

At 104, the ECU compares the last bit of a latest trip counter with the single bit of the trip flag. The latest trip counter is stored within a storage or memory of the ECU and includes the trip counter value stored from the most recent synchronization message received by the ECU.

At 106, the if the last bit of the latest trip counter matches the single bit of the trip flag, then the flow diagram 100 proceeds to 108. If the last bit of the latest trip counter does not match the trip flag included with the message, then the flow diagram 100 proceeds to 110.

At 108, if the single bit of the trip flag associated with the message matches the last bit of the latest trip counter, this confirms that the sending and receiving elements, such as a first ECU and a second ECU are using the same trip counter value for communication and are synchronized. The trip counter value is then used to process the authenticated message at 118.

At 110, if the single bit of the trip flag associated with the message does not match the last bit of the latest trip counter, this indicates that the sending and receiving element are not using the same trip counter value for communications. This may indicate that one or both of the elements, such as two ECUs missed or encountered an error and did not synchronize with the latest trip counter value conveyed from the FVM. At 110, the ECU compares the latest trip counter received from the synchronization message with a trip counter used to process a previously authenticated message.

At 112, if the latest trip counter value matches the previous trip counter value, then the flow diagram 100 proceeds to 114. If the latest trip counter value does not match the previous trip counter value, then the flow diagram 100 proceeds to 116.

At 114, if the latest trip counter value matches the previous trip counter value, this indicates that the ECU missed a synchronization message and the latest trip counter value must be incremented, as would have occurred had the ECU received the synchronization message. The ECU then increments the latest trip counter value so that the trip counter value stored at the ECU matches the most recent trip counter value sent by the FVM. The incremented trip counter value is then used to process the authenticated message at 118.

At 116, if the latest trip counter value does not match the previous trip counter value, this indicates that the sender, the second ECU, missed the synchronization message. In this instance, the ECU then selects to use the previous trip counter value used to authenticate a previous message for processing the authenticated message at 118 from the second ECU, such that the trip counter value used to process the message matches the trip counter value conveyed from the second ECU.

In the flow diagram 100 described above, the comparisons performed by the ECU may include bit-by-bit comparisons which compare the bit of, for example, the trip flag to the last single bit of the trip counter. In some examples, the trip flag may include multiple bits of data and the comparison may include comparing the multiple bits of the trip flag against multiple bits of the trip counter value.

Figure 2:
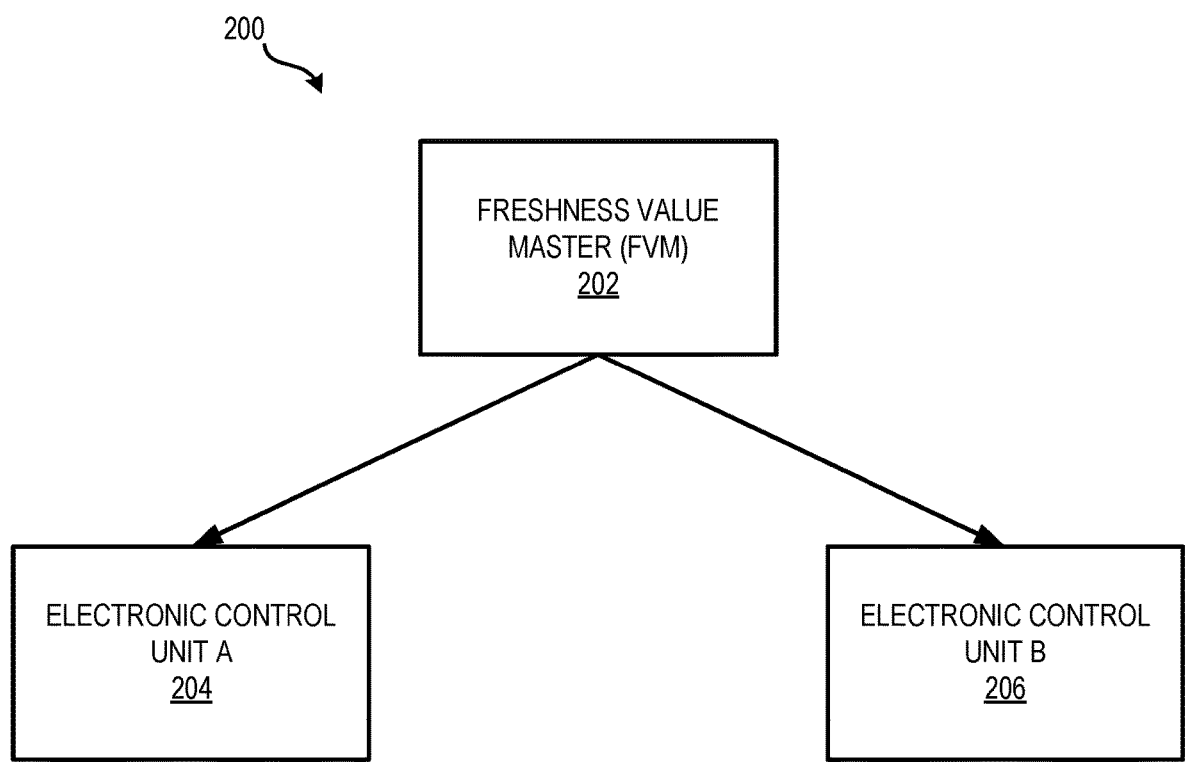
FIG. 2 illustrates a simplified block diagram illustrating a trip counter based freshness value management system, according to some embodiments.

FIG. 2 illustrates a simplified block diagram illustrating a TCBF value management system 200, according to some embodiments. In order to add freshness value for authenticated messages, proper freshness value management technique is necessary. The key requirement for this technique is to have a synchronization strategy where both transmitter and receiver are using the same freshness value while exchanging messages. The TCBF value management system 200 includes an FVM 202 as well as ECU A 204 and ECU B 206. In the TCBF value management system 200, a freshness value is introduced in the use of a set of decoupled counters. A trip counter increments on each startup or reset of the vehicle system. A reset counter increments periodically and resets to an initial value when the trip counter is incremented. A message counter increments per each message transmission and resets to an initial value when the reset counter is incremented. The ECU A 204 and ECU B 206 each function as senders and receivers via the in-vehicle network, such as the CAN bus and must have the same freshness value to properly exchange and process messages from each other.

Figure 6:
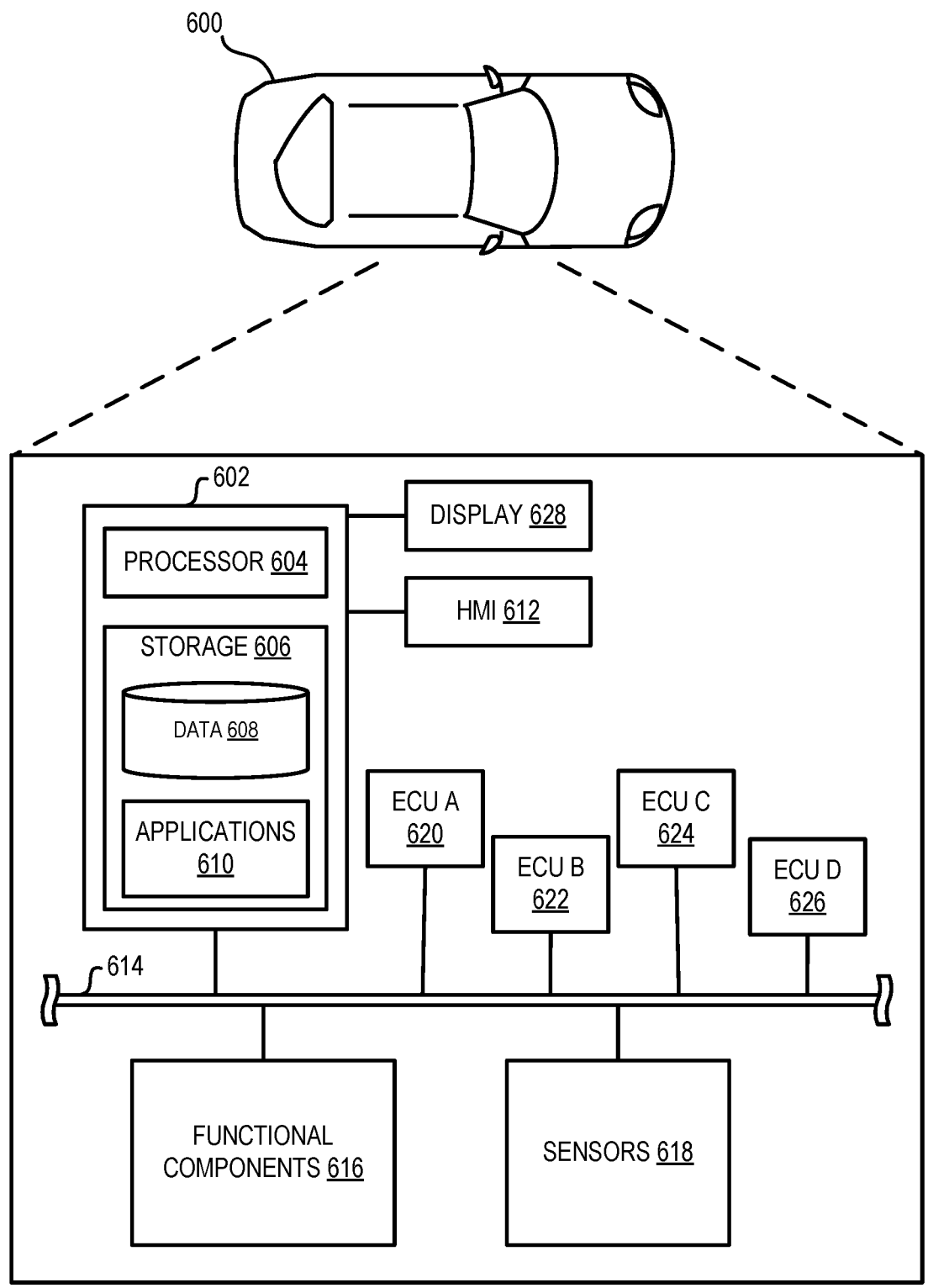
FIG. 6 illustrates a block diagram of a vehicle system, according to some embodiments.

FVM 202 may be a computer system or a subsystem of a computer system such as computing system 602 described with respect to FIG. 6. In some examples, FVM 202 may be an ECU, such as one of ECUs 620, 622, 624, or 626 of FIG. 6 that communicates with other ECUs as well as the computing system 602 over the in-vehicle network 614. ECU A 204 and ECU B may be embedded controllers in the vehicle system 600 of FIG. 6 including a processor and a memory device. In some examples, ECU A 204 and ECU B 206 may be a computing device, such as the computing system 602 of FIG. 6. ECU A 204 and ECU B may be any one of ECUs 620, 622, 624, or 626.

Though a TCBF strategy for providing message authentication is described and presented herein, there may be additional approaches to provide secure authenticated messages over the CAN bus of a vehicle which provide counters or reset values which may incorporate the trip flag and logic of FIG. 1 to provide secure, robust, and fast communication paths on the in-vehicle network.

The FVM 202 updates the trip counter and reset counter values and sends out a synchronization message to ECU A 204 and ECU B 206. The ECUs 204 and 206 combine the trip counter, reset counter, and message counter values and use them collectively for authenticated communication over the vehicle bus. The ECU A 204 and ECU B 206 receive the synchronization message and update local copies of the trip counter and reset counter stored on a memory of each of the ECUs 204 and 206. The ECUs 204 and 206 likewise maintain a message counter for each authenticated message, this enable the ECUs 204 and 206 to access a previous trip counter value or information related to a previous authenticated message based on the message counter value, which increments with each message sent and/or received.

The ECUs 204 and 206 each perform the flow diagram 100 with receipt of messages from one another, or from other ECUs or elements of the vehicle system to authenticate and verify messages before processing the message according to the message contents.

Figure 3:
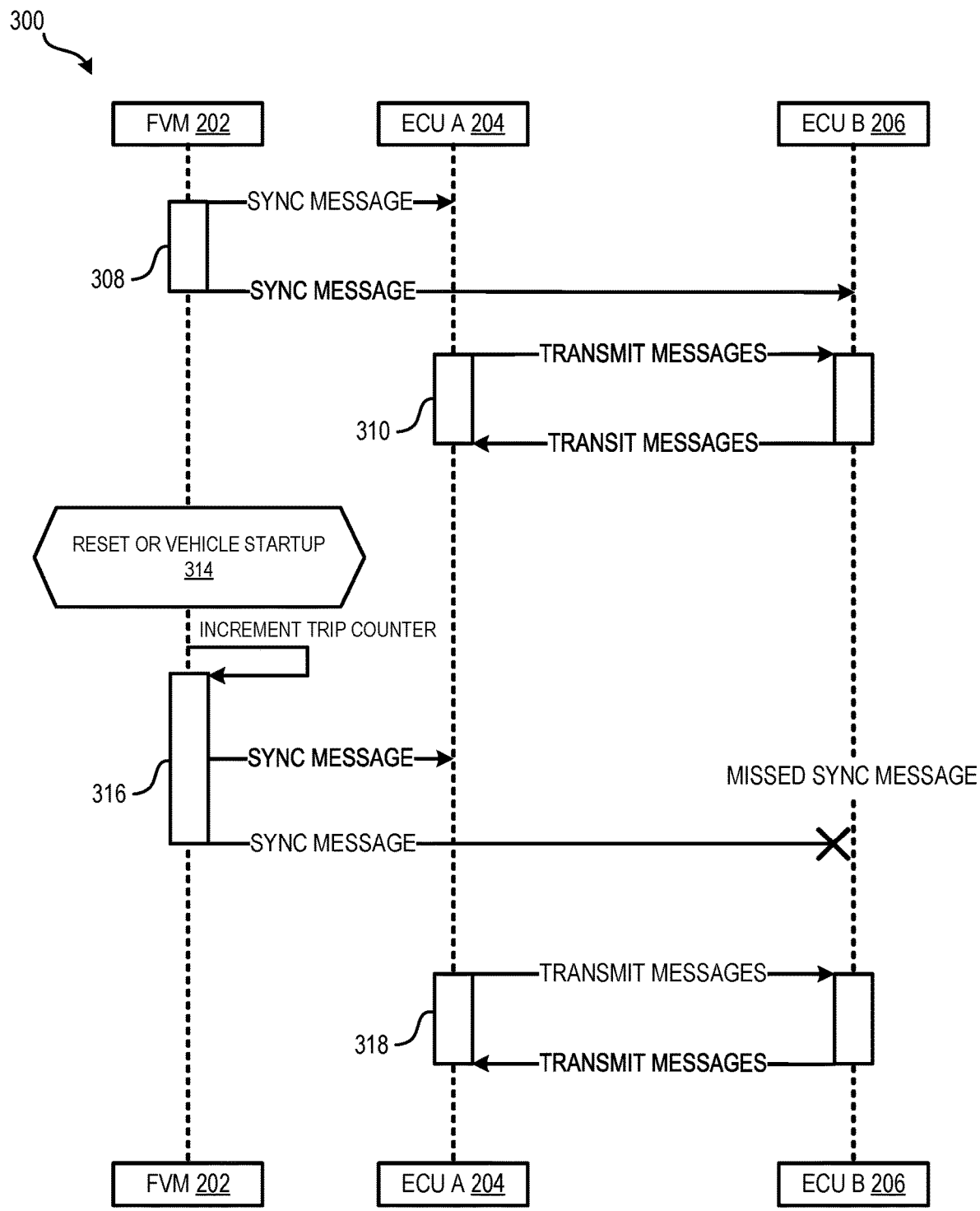
FIG. 3 illustrates a sequence diagram illustrating communication with a trip flag between an FVM, and two ECUs, according to some embodiments.

FIG. 3 illustrates a sequence diagram 300 illustrating communication with a trip flag between an FVM 202, and two ECUs 204 and 206, according to some embodiments. The FVM 202 may be incorporated as part of a vehicle computing system as described herein or may be included as a separate element including at least one processor and a memory with instructions to cause the processor to perform at least the functions described below. ECU A 204 and ECU B 206, may be any of the elements or ECUs described herein which implement the methods for message authentication and synchronization. Additionally, though the sequence diagram 300 is shown with only a single instance of the communications described below, it is within the spirit of the disclosure that the communications will be performed iteratively, periodically, or repeatedly in any manner.

At 308, the FVM 202 generates a synchronization message that is conveyed to ECU A 204 and ECU B 206. The synchronization message includes the trip counter value and the reset counter value described above with respect to FIG. 2. The synchronization message may be conveyed at a particular interval, or upon startup or reset of the vehicle system. As shown in the sequence diagram 300, the synchronization message is received by ECU A 204 and ECU B 206, which each update the stored synchronization information to the information included in the synchronization message.

At 310, ECU A 204 and ECU B 206 transmit messages back and forth with one another, for example with data or instructions relating to operation of the vehicle system. The trip counter, reset counter, and message counter information is synchronized for ECU A 204 and ECU B 206 so the messages are transmitted, received, and processed based on the synchronized information without errors. The messages transmitted and received at 310 each include a trip flag. The trip flag is a single bit of data compared against a stored trip counter value upon receipt of a message as described above with respect to FIG. 1. The trip flag is generated and attached to outgoing messages based on the trip counter data stored on the ECU sending the message. The single bit of data of the trip flag is compared against the last bit of data of the trip counter value stored on the ECUs. Since the trip counter values stored on the ECUs at 310 are synchronized, the trip flag attached to each outgoing message, corresponding to the last bit of data of the trip counter stored on ECU A 204, will match the last bit of data of the trip counter stored on ECU B 206 when ECU B 206 receives a message from ECU A 204 and vice versa.

At 314, the vehicle system is reset or started up, for example upon ignition. In response to the reset or startup, the trip counter value is incremented in an ascending manner. Additionally, the reset counter is returned to an initial value.

At 316, the FVM 202 conveys a synchronization message to ECU A 204 and ECU B 206 including the incremented trip counter as well as the reset counter. The synchronization message is received and processed at ECU A 204 but is not received or not processed at ECU B 206. The synchronization message may not be received and processed due to a communication error, interference, or other such malfunction. Following 316, ECU A 204 and ECU B 206 each include different trip counter values stored based on the most recent synchronization message received by each.

In a typical system, the desynchronization of ECU A 204 and ECU B 206 would cause messages transmitted at 318 between the ECUs to fail or not be trusted or authenticated. The trip counter values, reset values, and message values, may each differ between ECU A 204 and ECU B 206. The reset value and the message value for ECU A 204 may have reset after the synchronization message at 316, but the reset value and message value stored at ECU B 206 will not have reset.

In the sequence diagram 300, the messages transmitted at each include trip flags as described above with respect to messages transmitted at 310. Even though the trip counter value of the messages will not match the stored values due to the desynchronization, the ECUs will rely on the comparison of the trip flag and the corresponding process described above with respect to FIG. 1 to ensure messages are sent, received, and properly processed until a new synchronization message is sent by FVM 202 bringing ECU A 204 and ECU B 206 back into synchronization.

Figure 4:
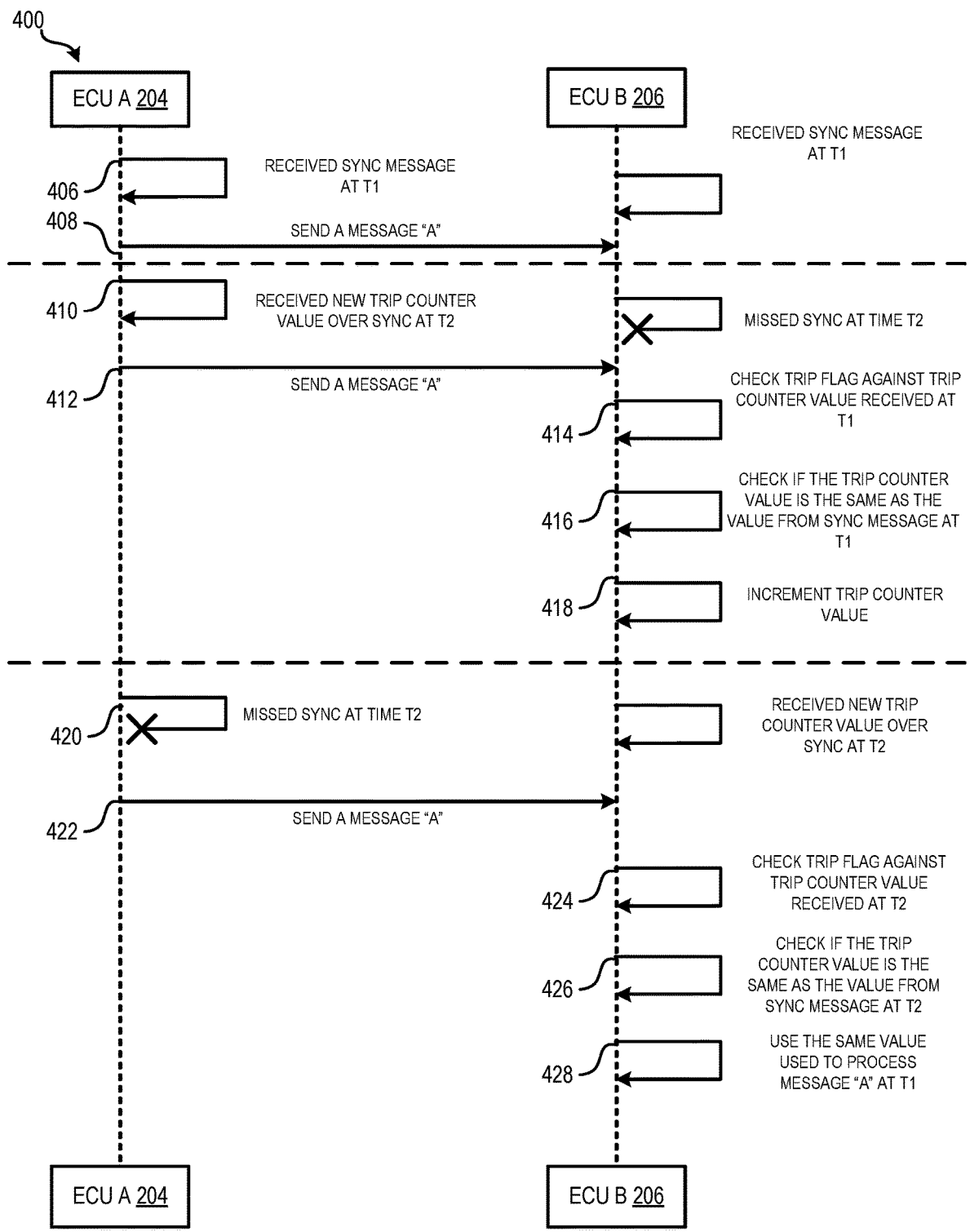
FIG. 4 illustrates a sequence diagram illustrating communication with a trip flag between two modules of a vehicle system, according to some embodiments.

FIG. 4 illustrates a sequence diagram 400 illustrating communication with a trip flag between two elements, ECU 204 and ECU 206, of a vehicle system, according to some embodiments. The two elements may be ECUs, computing devices, or other such components of a vehicle system communicating over an in-vehicle network (e.g., a CAN bus). Additionally, though the sequence diagram 300 is shown with only a single instance of the communications described below, it is within the spirit of the disclosure that the communications will be performed iteratively, periodically, or repeatedly in any manner.

At 406, an FVM, such as FVM 202 described above, conveys a synchronization message that is conveyed to ECU 204 and ECU 206. The synchronization message includes the trip counter value and the reset counter value described. The synchronization message may be conveyed at a particular interval, or upon startup or reset of the vehicle system. As shown in the sequence diagram 400, the synchronization message is received by ECU 204 and ECU 206 at a first time, T1, and each element updates the stored synchronization information to the information included in the synchronization message.

At 408, ECU 204 conveys a message to ECU 206, for example with data or instructions relating to operation of the vehicle system. The trip counter, reset counter, and message counter information is synchronized for ECU 204 and ECU 206 so the message is transmitted, received, and processed based on the synchronized information, trip counter and trip flag, without errors. The message transmitted at 408 includes a trip flag. The trip flag is a single bit of data compared against a stored trip counter value upon receipt of a message as described above with respect to FIG. 1. The trip flag is generated and attached to outgoing messages based on the trip counter data stored on the element sending the message. The single bit of data of the trip flag is compared against the last bit of data of the trip counter value stored on the elements. Since the trip counter values stored on the elements at 408 are synchronized, the trip flag attached to each outgoing message, corresponding to the last bit of data of the trip counter stored on ECU 204, will match the last bit of data of the trip counter stored on ECU 206 when ECU 206 receives the message from ECU 204. Though only a single message is shown transmitted from ECU 204 to ECU 206, other messages may be transmitted, and may be transmitted from ECU 206 to ECU 204 as well.

The next section of sequence diagram 400 beginning with 410 illustrates the communications and actions performed by the elements when the receiver, ECU 206, missed a synchronization message for any reason.

At 410, an FVM, such as FVM 202 described above, conveys a synchronization message that is conveyed to ECU 204 and ECU 206. The synchronization message includes the trip counter value and the reset counter value described. The synchronization message may be conveyed at a particular interval, or upon startup or reset of the vehicle system. As shown in the sequence diagram 400, the synchronization message is received by ECU 204 but not by ECU 206 at a second time, T2, such that ECU 204 updates the stored synchronization information to the information included in the synchronization message but ECU 206 will not update the stored information. ECU 204 and ECU 206 are desynchronized with each other as well as ECU 206 being desynchronized with the FVM.

At 412, ECU 204 conveys a message to ECU 206, as described above with respect to 408. As with other messages described herein, the message may be a message conveyed on a regular interval or periodic message including status information about the components of the vehicle system or operating data relating to the functions of the vehicle system.

At 414, ECU 206 checks the trip flag associated with the message conveyed at 412 against the last bit of data of the trip counter value received at T1 from the FVM. ECU 206 missed the most recent synchronization message and therefore the trip flag is not the same as the last bit of the stored trip counter value received at T1.

At 416, ECU 206 checks the trip counter value used to process the message at 408 against the trip counter value stored at T1. The trip counter value is the same as the trip counter value used to process the message at 408, so ECU 206 proceeds to increment the trip counter value in an ascending manner at 418 and process the message from 412.

The next section of sequence diagram 400 beginning with 420 illustrates the communications and actions performed by the elements when the sender of a message, ECU 204, missed a synchronization message for any reason.

At 420, an FVM, such as FVM 202 described above, conveys a synchronization message that is conveyed to ECU 204 and ECU 206. The synchronization message includes the trip counter value and the reset counter value described. The synchronization message may be conveyed at a particular interval, or upon startup or reset of the vehicle system. As shown in the sequence diagram 400, the synchronization message is received by ECU 206 but not by ECU 204 at a second time, T2, such that ECU 206 updates the stored synchronization information to the information included in the synchronization message but ECU 204 does not update the stored information. ECU 204 and ECU 206 are desynchronized with each other as well as ECU 204 being desynchronized with the FVM.

At 422, ECU 204 conveys a message to ECU 206, as described above with respect to 408 and 412. As with other messages described herein, the message may be a message conveyed on a regular interval or periodic message including status information about the components of the vehicle system or operating data relating to the functions of the vehicle system.

At 424, ECU 206 checks the trip flag associated with the message conveyed at 422 against the last bit of data of the trip counter value received at T2 from the FVM. Element A 404 missed the most recent synchronization message and therefore the trip flag is not the same as the last bit of the stored trip counter value received at T2.

At 426, ECU 206 checks the trip counter value used to process the message at 408 against the trip counter value stored at T2. The trip counter value is not the same as the trip counter value used to process the message at 408, so ECU 206 proceeds to 428 to use the same value that was previously used at 408 to process the message at 422.

Figure 5:
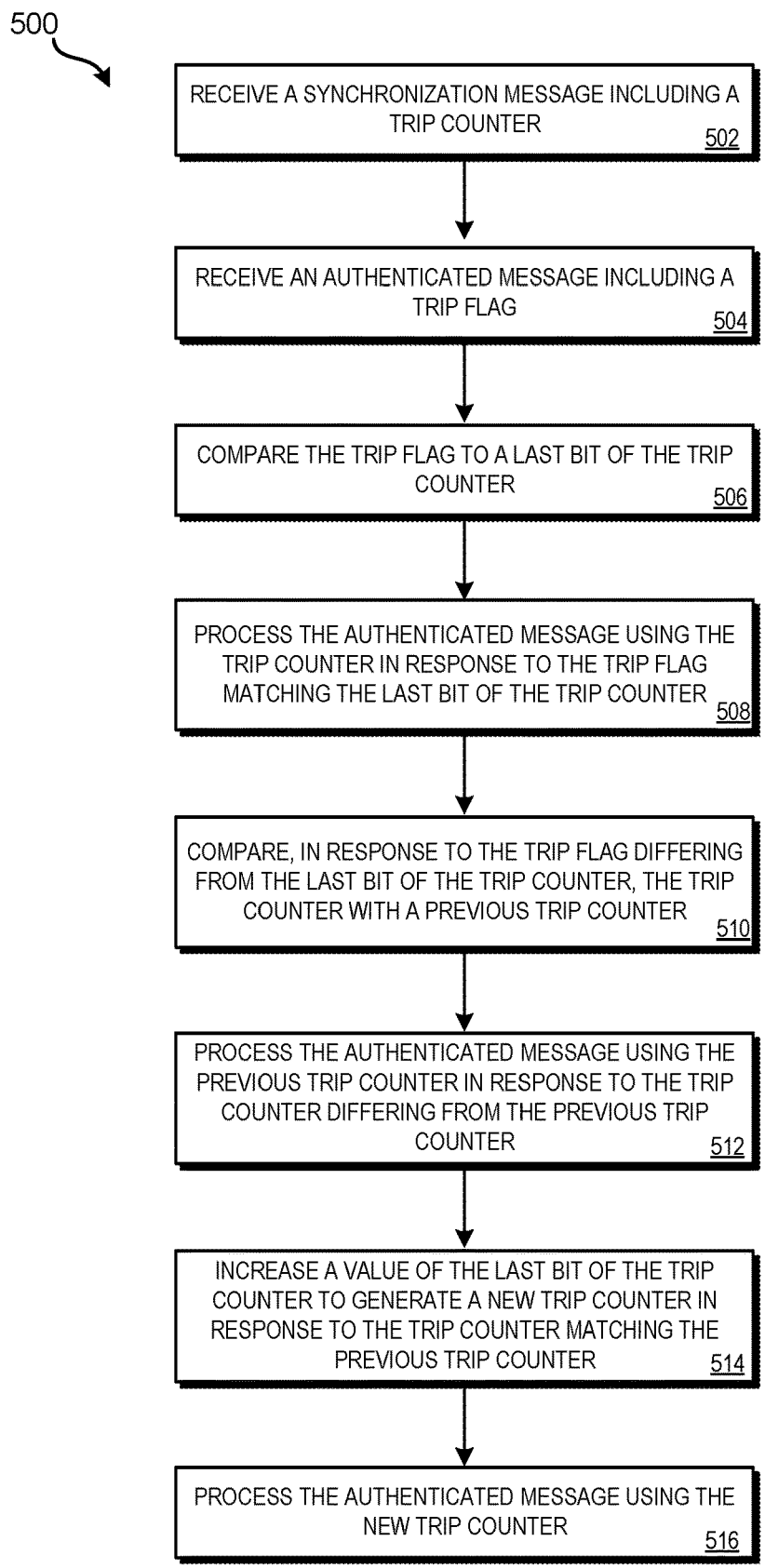
FIG. 5 illustrates a method for detecting and correcting desynchronization of trip counter values between transmitters and receivers of authenticated messages in a vehicle system, according to some embodiments.

FIG. 5 illustrates a method 500 for detecting and correcting desynchronization of trip counter values between transmitters and receivers of authenticated messages in a vehicle system, according to some embodiments. Method 500 may be performed by, for example an ECU, such as ECU A 204, ECU B 206, or any of ECUs 620, 622, 624, 626, or 626, involved in the sending or receiving of messages as well as a computing device, such as computing system 602 of a vehicle system. Though the steps of method 500 are presented in a sequential order, some or all of the steps may be performed in different sequences in some examples.

At step 502, the computing device, which may be an ECU such as ECU A 204, ECU B 206, receives a synchronization message from an FVM, such as FVM 202 including a trip counter. The synchronization message may also include a reset value or other data. The synchronization message may cause the ECU to update a stored trip counter value as well as a trip flag value attached to each outgoing message from the ECU reflecting the last bit of data of the trip counter.

At step 504, the ECU receives a message from another ECU or other element of the vehicle system. As with other messages described herein, the message may be a message conveyed on a regular interval or periodic message including status information about the components of the vehicle system or operating data relating to the functions of the vehicle system.

At step 506, the ECU compares the trip flag associated with the message received at step 504 against the last bit of data of the trip counter value received at step 502. The comparison may involve direct comparison of the single bit of the trip flag against the last bit of the trip counter value. In some examples, the comparison may involve additional data or greater than a single bit of data associated with the trip flag.

At step 508, the ECU processes the authenticated message using the trip counter in response to the trip flag matching the last bit of the trip counter value when compared at step 506. Step 508 may also include the ECU performing functions associated with the contents of the message, such as sending a signal to a functional component of the vehicle system.

At step 510, the ECU compares, in response to the trip flag differing from the last bit of the trip counter at step 506, the trip counter value with a previous trip counter value used by the ECU to process a message. This may be similar to the comparison performed at 426 of FIG. 4 above.

At step 512, the ECU processes the authenticated message using the previous trip counter in response to the trip counter differing from the previous trip counter based at least in part on the comparison performed at step 510. Step 512 may also include the ECU performing functions associated with the contents of the message, such as sending a signal to a functional component of the vehicle system.

At step 514, the ECU increases a value of the last bit of the trip counter to generate a new trip counter, stored by the ECU, in response to the trip counter matching the previous trip counter from the comparison of step 510. This may be similar to the increase in trip counter performed at block 114 of FIG. 1.

At step 516, the ECU processes the authenticated message using the new trip counter generated at step 514. Step 516 may also include the ECU performing functions associated with the contents of the message, such as sending a signal to a functional component of the vehicle system.

Figure 7:
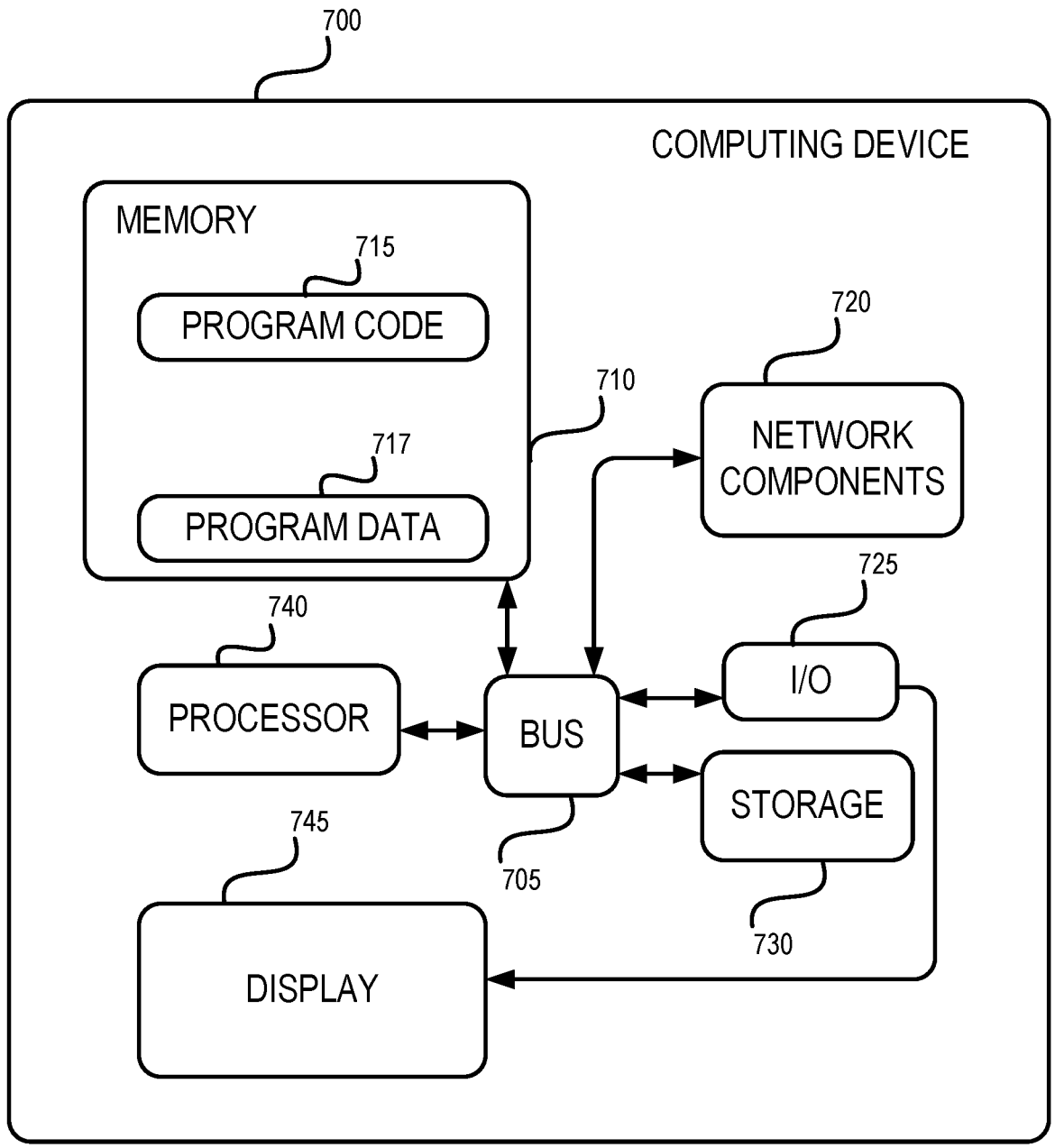
FIG. 7 illustrates a block diagram of a vehicle system, according to some embodiments.

Any suitable computing system or group of computing systems can be used for performing the operations or methods described herein. For example, FIG. 6 illustrates a vehicle system including a computing system 602 as well as multiple ECUs which may perform some or all of the functions described herein. FIG. 7 further depicts an example of a computing device 700 that may be at least a portion of computing system 602.

FIG. 6 illustrates a block diagram of a vehicle system 600, according to some embodiments. The vehicle system 600 may include a computing system 602 configured to communicate over an in-vehicle network 614. The computing system 602 includes a processor 604 and storage 606. While a vehicle system 600 is shown in FIG. 6, the example components as illustrated are not intended to be limiting. Indeed, the vehicle system 600 may have more or fewer components, and additional or alternative components and/or implementations may be used. It should be noted that the use of a vehicle system 600 environment is illustrative, as the functional safety measures and security measures may be utilized in other types of systems such as flight control system in an airplane, or a medical device or industrial machine.

The vehicle system 600 may include various types of automobile, crossover utility vehicle (CUV), sport utility vehicle (SUV), truck, recreational vehicle (RV), boat, plane or other mobile machine for transporting people or goods. In many cases, the vehicle system 600 may be powered by an internal combustion engine. As another possibility, the vehicle system 600 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of the vehicle system 600 may vary, the capabilities of the vehicle system may correspondingly vary. As some other possibilities, vehicle system 600 may have different capabilities with respect to passenger capacity, towing ability and capacity, and storage volume.

The computing system 602 may include a Human Machine Interface (HMI) 612 and a display 628 for user interaction with the computing system 602. An example computing system 602 may be the SYNC™ system provided by FORD MOTOR COMPANY™ of Dearborn, Mich. In some examples the display 628 may include a vehicle infotainment system including one or more displays. The HMI 612 may be configured to support voice command and BLUETOOTH™ interfaces with the driver and driver carry-on devices, receive user input via various buttons or other controls, and provide vehicle status information to a driver or other vehicle system 600 occupants. For instance, the computing system 602 may interface with one or more buttons or other HMI 612 configured to invoke functions on the computing system 602 (e.g., steering wheel audio buttons, a push-to-talk button, instrument panel controls, etc.). The computing system 602 may also drive or otherwise communicate with the display 628 configured to provide visual output to vehicle occupants, e.g., by way of a video controller. In some cases, the display 628 may be a touch screen further configured to receive user touch input via the video controller, while in other cases the display 628 may be a display only, without touch input capabilities. In an example, the display 628 may be a head unit display included in a center console area of the vehicle system 600. In another example, the display 628 may be a screen of a gauge cluster of the vehicle system 600.

The computing system 602 may further include various types of computing apparatus in support of performance of the functions of the computing system 602 described herein. In an example, the computing system 602 may include one or more processors 604 configured to execute computer instructions, and a storage 606 medium on which computer-executable instructions and/or data may be maintained. A computer-readable medium (also referred to as a processor-readable medium or storage 606) includes any non-transitory (e.g., tangible) medium that participates in providing data (e.g., instructions) that may be read by a computer (e.g., by the one or more processors 604). In general, the processor 604 receives instructions and/or data, e.g., from the storage 606, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, PL/SQL, etc. The storage 606 may include divisions for data 608 and applications 610. The data 608 may store information such as databases and other such information. The applications 610 may store the computer-executable instructions or other such instructions executable by the processor 604.

The computing system 602 may be configured to communicate with mobile devices of the vehicle system 600 occupants. The mobile devices may be any of various types of portable computing device, such as cellular phones, tablet computers, smart watches, laptop computers, portable music players, or other devices capable of communication with the computing system 602. As with the computing system 602, the mobile device may include one or more processors configured to execute computer instructions, and a storage medium on which the computer-executable instructions and/or data may be maintained. In some examples, the computing system 602 may include a wireless transceiver (e.g., a BLUETOOTH™ controller, a ZIGBEE™ transceiver, a Wi-Fi transceiver, etc.) configured to communicate with a compatible wireless transceiver of the mobile device. Additionally, or alternately, the computing system 602 may communicate with the mobile device over a wired connection, such as via a USB connection between the mobile device and a Universal Serial Bus (USB) subsystem of the computing system 602.

The computing system 602 may be further configured to communicate with other components of the vehicle system 600 via one or more in-vehicle networks 614. The in-vehicle networks 614 may include one or more of a vehicle controller area network (CAN), an Ethernet network, or a media oriented system transfer (MOST), as some examples. The in-vehicle networks 614 may allow the computing system 602 to communicate with other units of the vehicle system 600, such as ECU A 620, ECU B 622, ECU C 624, and ECU D 626. The ECUs 620, 622, 624, and 626 may include various electrical or electromechanical systems of the vehicle system 600 or control various subsystems of the vehicle system 600. Some non-limiting examples of ECUs include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle system 600); a radio transceiver module configured to communicate with key fobs or other vehicle system 600 devices, a climate control management module configured to provide control and monitoring of heating and cooling system components (e.g., compressor clutch and blower fan control, temperature sensor information, etc.) as well as a transmission control module, a brake control module, a central timing module, a suspension control module, a vehicle modem (which may not be present in some configurations), a global positioning system (GPS) module configured to provide vehicle system 600 location and heading information, and various other vehicle ECUs configured to corporate with the computing system 602. The subsystems controlled by the various ECUs may include functional components 616 of the vehicle system 600 including elements such as the powertrain, engine, brakes, lights, steering components, and the like. Additionally, some or all of the functional components 616 may include sensors 618 as well as additional sensors equipped to the vehicle system 600 for detecting various states, positions, proximity, temperature, and the like of the vehicle system 600 and subsystems thereof. The ECUs 620, 622, 624, 626 may communicate with the computing system 602 as well as the functional components 616 and the sensors 618 over the in-vehicle network 614. While only four ECUs are depicted in FIG. 6, any number (more or fewer) of ECUs may be included in vehicle system 600.

FIG. 7 illustrates a block diagram of an example of a computing device 700. Computing device 700 can be any of the described computers herein including, for example, computing system 602 within the vehicle system 600 of FIG. 6 as well as ECUs 620, 622, 624, 626. The computing device 700 can be or include, for example, an integrated computer, a laptop computer, desktop computer, tablet, server, or other electronic device.

The computing device 700 can include a processor 740 interfaced with other hardware via a bus 705. A memory 710, which can include any suitable tangible (and non-transitory) computer readable medium, such as RAM, ROM, EEPROM, or the like, can embody program components (e.g., program code 715) that configure operation of the computing device 700. Memory 710 can store the program code 715, program data 717, or both. In some examples, the computing device 700 can include input/output ("I/O") interface components 725 (e.g., for interfacing with a display 745, keyboard, mouse, and the like) and additional storage 730.

The computing device 700 executes program code 715 that configures the processor 740 to perform one or more of the operations described herein. Examples of the program code 715 include, in various embodiments logic flowchart described with respect to FIG. 1 above. The program code 715 may be resident in the memory 710 or any suitable computer-readable medium and may be executed by the processor 740 or any other suitable processor.

The computing device 700 may generate or receive program data 717 by virtue of executing the program code 715. For example, sensor data, trip counter, authenticated messages, trip flags, and other data described herein are all examples of program data 717 that may be used by the computing device 700 during execution of the program code 715.

The computing device 700 can include network components 720. Network components 720 can represent one or more of any components that facilitate a network connection. In some examples, the network components 720 can facilitate a wireless connection and include wireless interfaces such as IEEE 802.11, BLUETOOTH™, or radio interfaces for accessing cellular telephone networks (e.g., a transceiver/antenna for accessing CDMA, GSM, UMTS, or other mobile communications network). In other examples, the network components 720 can be wired and can include interfaces such as Ethernet, USB, or IEEE 1394.

Although FIG. 7 depicts a computing device 700 with a processor 740, the system can include any number of computing devices 700 and any number of processor 740. For example, multiple computing devices 700 or multiple processor 740 can be distributed over a wired or wireless network (e.g., a Wide Area Network, Local Area Network, or the Internet). The multiple computing devices 700 or multiple processor 740 can perform any of the steps of the present disclosure individually or in coordination with one another.

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. A vehicle system, comprising:
a freshness value master;
a first electronic control unit; and
a second electronic control unit communicatively coupled to the first electronic control unit and the freshness value master, the second electronic control unit comprising a memory having stored thereon instructions that, upon execution by one or more processors, cause the one or more processors to:
receive a synchronization message from the freshness value master, the synchronization message comprising a trip counter;
receive an authenticated message from the first electronic control unit, the authenticated message comprising a trip flag, the trip flag comprising a single bit of data;
compare the trip flag to a last bit of the trip counter to generate a result; and
process the authenticated message based on the result.

2. The vehicle system of claim 1, wherein the result is that the trip flag matches the last bit of the trip counter, and wherein the instructions to process the authenticated message comprise further instructions that, upon execution by the one or more processors, cause the one or more processors to:
process the authenticated message using the trip counter.

3. The vehicle system of claim 1, wherein the result is that the trip flag differs from the last bit of the trip counter, and wherein the instructions to process the authenticated message comprise further instructions that, upon execution by the one or more processors, cause the one or more processors to:
compare the trip counter with a previous trip counter of a previous authenticated message processed by the first electronic control unit;
process the authenticated message using the previous trip counter based on a determination that the trip counter differs from the previous trip counter; and
based on a determination that the trip counter matches the previous trip counter:
increase a value of the last bit of the trip counter to generate a new trip counter; and
process the authenticated message using the new trip counter.

4. The vehicle system of claim 1, wherein the freshness value master transmits the synchronization message at a periodic interval.

5. The vehicle system of claim 1, wherein the freshness value master increments the trip counter in response to a startup or a reset of the vehicle system.

6. The vehicle system of claim 1, wherein the first electronic control unit is communicatively coupled to the second electronic control unit via a vehicle data bus.

7. The vehicle system of claim 6, wherein the vehicle data bus is a Controller Area Network (CAN) bus.

8. A computer-implemented method, comprising:
receiving, at a first electronic control unit, a synchronization message from a freshness value master, the synchronization message comprising a trip counter;
receiving, at the first electronic control unit, an authenticated message from a second electronic control unit, the authenticated message comprising a trip flag comprising a single bit of data;
comparing the trip flag to a last bit of the trip counter to generate a result; and
processing the authenticated message based on the result.

9. The computer-implemented method of claim 8, wherein the result is that the trip flag matches the last bit of the trip counter, and wherein processing the authenticated message comprises processing the authenticated message using the trip counter.

10. The computer-implemented method of claim 8, wherein the result is that the trip flag differs from the last bit of the trip counter, and wherein processing the authenticated message comprises:
comparing the trip counter with a previous trip counter of a previous authenticated message processed by the first electronic control unit;

processing the authenticated message using the previous trip counter based on a determination that the trip counter differs from the previous trip counter; and based on a determination that the trip counter matches the previous trip counter:
  increasing a value of the last bit of the trip counter to generate a new trip counter; and
  processing the authenticated message using the new trip counter.

11. The computer-implemented method of claim 8, wherein the freshness value master transmits the synchronization message at a periodic interval.

12. The computer-implemented method of claim 8, wherein the freshness value master increments the trip counter in response to a startup or a reset of a vehicle system.

13. The computer-implemented method of claim 8, wherein the first electronic control unit is communicatively coupled to the second electronic control unit via a vehicle data bus.

14. The computer-implemented method of claim 13, wherein the vehicle data bus is a Controller Area Network (CAN) bus.

15. A non-transitory, computer-readable medium comprising instructions that, when executed by one or more processors, cause the one or more processors to:
  receive, at a first electronic control unit, a synchronization message from a freshness value master, the synchronization message comprising a trip counter;
  receive, at the first electronic control unit, an authenticated message from a second electronic control unit, the authenticated message comprising a trip flag, the trip flag comprising a single bit of data;
  compare the trip flag to a last bit of the trip counter to generate a result; and
  process the authenticated message based on the result.

16. The non-transitory, computer-readable medium of claim 15, wherein the result is that the trip flag matches the last bit of the trip counter, and wherein the instructions to process the authenticated message comprise further instructions that, upon execution by the one or more processors, cause the one or more processors to:
  process the authenticated message using the trip counter.

17. The non-transitory, computer-readable medium of claim 15, wherein the result is that the trip flag differs from the last bit of the trip counter, and wherein the instructions to process the authenticated message comprise further instructions that, upon execution by the one or more processors, cause the one or more processors to:
  compare the trip counter with a previous trip counter of a previous authenticated message processed by the first electronic control unit;
  process the authenticated message using the previous trip counter based on a determination that the trip counter differs from the previous trip counter; and
  based on a determination that the trip counter matches the previous trip counter:
    increase a value of the last bit of the trip counter to generate a new trip counter; and
    process the authenticated message using the new trip counter.

18. The non-transitory, computer-readable medium of claim 15, wherein the freshness value master transmits the synchronization message at a periodic interval.

19. The non-transitory, computer-readable medium of claim 15, wherein the freshness value master increments the trip counter in response to a startup or a reset of a vehicle system.

20. The non-transitory, computer-readable medium of claim 15, wherein the first electronic control unit is communicatively coupled to the second electronic control unit via a vehicle data bus.

\* \* \* \* \*